United States Patent [19]

Chase

[11] Patent Number: 5,487,575
[45] Date of Patent: Jan. 30, 1996

[54] ELECTROPLATED THERMOPLASTIC AUTOMOTIVE GRILLE HAVING IMPROVED FLEXIBILITY

[75] Inventor: Lee A. Chase, Ada, Mich.

[73] Assignee: Lacks Industries, Inc., Grand Rapids, Mich.

[21] Appl. No.: 434,739

[22] Filed: May 4, 1995

Related U.S. Application Data

[62] Division of Ser. No. 99,748, Jul. 30, 1993, Pat. No. 5,452,931.

[51] Int. Cl.$^6$ .............................. B62D 25/08; B05D 1/32
[52] U.S. Cl. .................. 293/115; 180/68.6; 427/259
[58] Field of Search .................... 293/115, 128, 293/120, 102; 180/68.6; 296/901; 428/31; 427/259, 306, 256

[56] References Cited

U.S. PATENT DOCUMENTS

| | | | |
|---|---|---|---|
| 2,578,068 | 11/1948 | Johnson | 293/132 |
| 3,792,889 | 2/1974 | Fuener et al. | 293/115 |
| 4,264,646 | 4/1981 | Thornburg et al. | 427/98 |
| 4,537,799 | 8/1983 | Dorey, II et al. | 427/259 |
| 4,592,808 | 6/1986 | Doubt | 427/259 X |
| 4,753,468 | 6/1988 | Szymczak et al. | 293/132 |
| 4,834,436 | 4/1989 | Nguyen | 293/115 |
| 4,917,203 | 4/1990 | Sacco et al. | 180/68.6 |
| 4,940,608 | 7/1990 | Kawagishi et al. | 427/259 |
| 4,944,540 | 7/1990 | Mansoor et al. | 293/115 |
| 5,104,711 | 4/1992 | Marsek | 428/78 |
| 5,121,134 | 6/1992 | Albinson et al. | 427/259 X |
| 5,139,830 | 8/1992 | Gross | 294/128 X |
| 5,194,305 | 3/1993 | Shirahata et al. | 293/128 X |
| 5,205,597 | 4/1993 | Chase | 293/115 |

*Primary Examiner*—Joseph D. Pape
*Attorney, Agent, or Firm*—Remy J. VanOphem; John VanOphem

[57] ABSTRACT

An automobile grille which is selectively chromium plated so as to promote the flexural properties of the grille. By optimizing the flexural properties of the grille, the grille is more readily capable of withstanding a frontal impact without sustaining permanent damage. Preferably, the chromium plating is selectively deposited on exposed surfaces of the grille so as to minimize the detrimental effect which a hard and brittle chromium plating has on the flexural modulus of the grille. As a result, the grille is more readily able to flex under the load of an impact directed into the grille from the front of the automobile. In addition, chromium plating is deposited on surfaces of the grille which predominantly see compressive loading, so as to reduce the likelihood that the chromium plating will crack in tension. The grille is particularly suitable for mounting flush with an impact-absorbing bumper, such that the grille is capable of resiliently deflecting with the stroke of the bumper.

7 Claims, 1 Drawing Sheet

U.S. Patent    Jan. 30, 1996    5,487,575
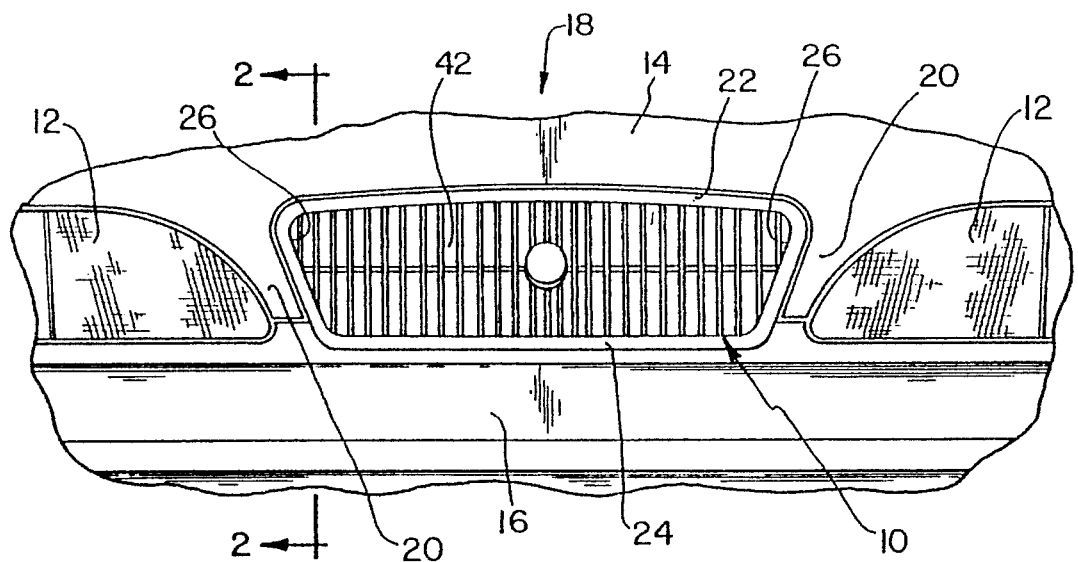
FIG. 1
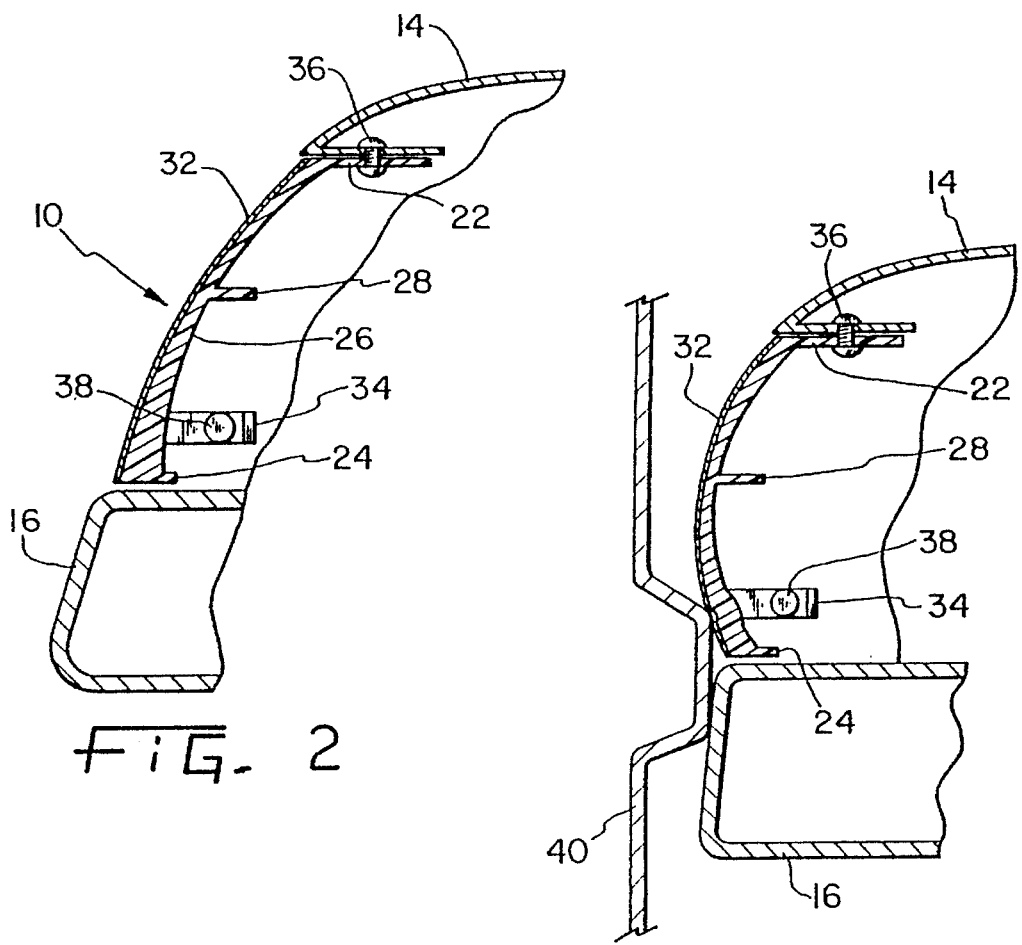
FIG. 2
FIG. 3

ELECTROPLATED THERMOPLASTIC AUTOMOTIVE GRILLE HAVING IMPROVED FLEXIBILITY

This is a division, of application Ser. No. 08/099,748, filed Jul. 30, 1993, U.S. Pat. No. 5,452,931.

BACKGROUND OF THE INVENTION

1. Field of the Invention

The present invention generally relates to automobile grilles positioned at the front end of an automobile. More specifically, this invention relates to an automobile grille having a decorative metallic plating, wherein the decorative metallic plating is selectively deposited on the grille so as to optimize the flexural properties of the grille. The grille of this invention is particularly well suited for use with impact-absorbing bumpers which automatically rebound from a frontal impact.

2. Description of the Prior Art

Automobile grilles have generally evolved from what once was primarily a barrier to protect an automobile's radiator to its present status as primarily a decorative feature, though also often serving as the primary source of ventilation to the radiator. Accordingly, the earlier grilles were formed from metal so as to have adequate strength to deflect objects from hitting the radiator. Today, the role of the automobile grille as a barrier has been largely supplanted by modern practices which position the radiator such that it is protected by other means. For styling purposes, the automobile grille is still present on most modern automobiles, though generally formed from plastic to save weight.

With the advent of energy or impact-absorbing bumpers, automobile grilles have been required to undergo significant design changes in order to accommodate the stroke of the bumper, which can be as much as 3 to 4 inches. Current grille designs have followed primarily three approaches. The first and traditional approach is to position the grille entirely out of the path of the bumper during recoil after impact. This approach generally entails placing the automobile grille rearward of the bumper, resulting in an extremely square-looking profile which has little appeal according to modern design trends. In addition, such a design is not aerodynamic, and as such this approach is not generally followed, particularly as fuel efficiency becomes increasingly important.

A second approach is to completely eliminate the grille, which generally entails sweeping the engine hood down such that it is suspended just above the bumper line. However, this approach has not been widely adopted in that it has rather limited styling appeal.

A third approach is to require the grille to be displaceable such that it can pivot or otherwise move out of the bumper's path during impact. Preferably, this approach allows the grille to be mounted flush with the surrounding hood, front end body panels, and bumper so as to enhance the styling effect and aerodynamics of the automobile. Such an approach is illustrated by U.S. Pat. No. 3,792,889 to Fuener et al. During impact, the rearward travel of the bumper forces the grille to pivot rearwardly about the grille's lower edge and against a spring element. Another example of the third approach is taught by U.S. Pat. No. 4,753,468 to Szymczak et al., which provides a pivot arm which pivots the grille rearwardly and upwardly during impact. Yet another example is shown in U.S. Pat. No. 4,834,436 to Nguyen, which substantially eliminates the arcuate displacement of the grilles of both Fuener et al. and Szymczak et al. by employing a four-bar linkage that displaces the grille in an entirely rearward manner during impact. U.S. Pat. No. 4,944,540 to Mansoor et al. also seeks to avoid an arcuate path by the grille during impact by a pin and slot arrangement having a return spring.

As can be readily appreciated by those skilled in the art, the above examples corresponding to the third approach all entail additional hardware and space to accommodate the displacement of the grille. In addition, the added hardware is also necessary to adequately support the grille so as to be able to withstand wind resistance and road vibration while the vehicle is in use. But the additional hardware requirement itself is a disadvantage when it comes to both costs and weight from the standpoint of the vehicle manufacturer. The added costs entailed in purchasing and installing the above required hardware to achieve the desired results will generally be substantial, while the additional weight adversely affects the performance and fuel economy of the vehicle. Both considerations are of primary importance in the highly competitive automobile market.

An approach which tends to avoid the problems noted above is illustrated in U.S. Pat. No. 2,578,068 to Johnson. Johnson teaches a resilient grille and bumper combination which is resiliently attached at its lower edge to the automobile's frame. A more modern version of this approach is illustrated by U.S. Pat. No. 4,917,203 to Sacco et al. There, a grille is disclosed which is supported within a radiator cover. The radiator cover is secured to and suspended from the engine hood by resilient inner plates which allow the radiator cover to pivot elastically about the edge of the hood when the bumper is impacted. An advantage to the above structure is that the added hardware and weight associated with the teachings of Fuener et al., Szymczak et al., Nguyen, and Mansoor et al. are avoided. In addition, Sacco et al. particularly illustrate the styling and aerodynamic benefits to the automobile when the grille is mounted flush with the surrounding body panels and bumper.

However, the grilles taught by both Johnson and Sacco et al. have two significant disadvantages. First, the space requirements for the arcuate motion, recognized as being undesirable by Nguyen, are again present, such that a significant amount of space must be provided for the radiator cover to be displaced within the front end of the automobile. Second, the radiator cover can only be attached along one edge so as to allow the resilient pivotable movement between the radiator cover and the hood. As a result, the radiator cover is highly susceptible to wind and road vibrations, a clearly undesirable characteristic.

As a solution to each of the above disadvantages, U.S. Pat. No. 5,205,597 to Chase, assigned to the assignee of this invention, teaches an automobile grille which has the advantages of being able to deflect with the bumper during impact and being sufficiently supported by the automobile body, yet simultaneously avoids the need for added hardware and weight for purposes of providing these desirable capabilities. The solution taught by Chase involves modifying the internal structure of an automobile grille to provide a mode of resilience which enables the grille to absorb an impact with the bumper, while still being securely attached to the automobile body. In particular, Chase teaches a grille formed entirely from a resilient impact-resistant material, such as a high impact plastic, having a yield strength which is sufficient to endure the amount of deflection required to deflect with the bumper's stroke. The grille includes a generally elongated body portion which extends across a portion of the automobile's front end as determined by the automobile's particular design. The body portion has an upper edge which is preferably attached to the engine hood of the automobile, and a lower edge which generally extends horizontally adjacent to the bumper.

To provide the necessary deflection capability of the grille, at least the lower edge is formed to have a section modulus which varies along its length. Preferably, the section modulus of the lower edge has at least one locally reduced region so as to permit an enhanced degree of yielding without exceeding the yield strength of the material. As a result, the resiliency of the entire automobile grille is enhanced.

While the solution taught by Chase enables the automobile grille to flex significantly without sustaining permanent damage, the presence of a conventional decorative plating on such an automobile grille significantly increases the flexural modulus of the automobile grille. As used here, the term "flexural modulus" serves to quantify the suitability of a particular polymeric material for an application which requires a significant degree of flexing. Typically, articles made from such materials will be tested by flexing a test specimen at its center while being supported at two peripheral points. The flexural modulus indicates the stress-versus-strain relationship of the polymeric material, which serves as an indication of the ability of the article to be repeatedly flexed without becoming plastically deformed.

The presence of a decorative metallic coating, such as electroplated chromium, on an automobile grille dramatically increases the grille's apparent flexural modulus, at times by a factor of five or more. As a result, significantly less flexing is permitted for a given impact force. In the case where a grille is forced to deflect with an impact-absorbing bumper, the flexing required of the grille in order to accompany the bumper through its maximum stroke may plastically deform the grille and permanently damage the grille's decorative coating. Yet, such decorative coatings are highly desirable from an aesthetic standpoint, such that their elimination is not a viable solution.

Accordingly, what is needed is a flexible automobile grille which is provided with a decorative metallic coating, wherein the grille is capable of being rigidly attached to the surrounding automobile front end body panels and/or bumper, so as to withstand wind and road vibration, yet is also able to readily flex during impact or during the displacement of the bumper without incurring permanent damage to the physical structure of the grille or the grille's decorative coating.

SUMMARY OF THE INVENTION

According to the present invention there is provided an automobile grille for an automobile having an impact-absorbing bumper. The grille of the present invention is provided with a decorative metallic coating, and designed to be mounted substantially flush with the surrounding automobile front end body panels and bumper, so as to be capable of deflecting with the stroke of the impact-absorbing bumper during impact. The grille is preferably formed at least in part from a resilient, impact resistant material. To achieve enhanced flexibility of the grille, the decorative metallic coating is selectively deposited on the grille so as to optimize the flexural properties of the grille, such that the grille is more flexible and less likely to sustain permanent damage during impact, particularly when used in conjunction with an impact-absorbing bumper.

Generally, the grille includes an elongated body portion which extends across a portion of the automobile's front end as determined by the automobile's particular design. The body portion is generally the patterned central portion of the grille, often including a cross hatch or vertical arrangement of slats. The body portion has an upper edge which generally extends horizontally adjacent the engine hood of the automobile, a lower edge which generally extends horizontally adjacent the bumper, and preferably an intermediate member which generally extends horizontally between the upper and lower edges. The upper edge may be configured to attach to the automobile, depending on the styling preference for a particular design and the nature of the application. As such, the upper edge will typically be attached either to the engine hood or at another convenient location on the front end of the automobile, based on the design criteria and application. In addition, attachment portions are formed along the sides of the lower edge for attachment to the automobile, either to the automobile body or to the bumper or bumper fascia, or a combination thereof. In any event, the body portion is secured to the automobile so as to enable the grille to readily flex when impacted by a source external to the automobile.

The body portion defines an exterior surface of the grille which is visibly exposed when the grille is installed on the automobile, such that the exterior surface defines the decorative surface of the grille. The body portion also defines an oppositely disposed, interior surface which faces the engine compartment of the automobile. The body portion also has side surfaces which are defined by the sides of the individual members of the body portion, such as the slats noted above, such that the side surfaces are intermediate the external and internal surfaces. Though dependent on the geometry of the grille, the exterior surface will typically be primarily in compression when the grille flexes as a result of an impact, while the internal surface will typically be primarily in tension.

In accordance with U.S. Pat. No. 5,205,597 to Chase, at least the body portion and its lower edge are formed from a high impact polymeric material. In addition, to enhance the deflection capability of the grille, one or more of the upper or lower edges or the intermediate member preferably has a variable section modulus along its length. According to the teachings of Chase, the variable section modulus serves to enhance the degree of yielding which can be achieved without exceeding the yield strength of the material. As a result, the flexibility of the entire automobile grille is enhanced.

In accordance with the present invention, in order to more fully exploit the degree of flexibility provided by a grille formed in accordance with Chase, the decorative metallic layer is selectively deposited on the exterior surfaces of the grille using a resist painting technique, such that the decorative metallic layer is selectively deposited only where necessary for aesthetic purposes. Generally, the decorative metallic layer will be limited to the exterior surface and possibly also limited portions of the side surfaces of the grille, and will preferably be completely absent from the interior surface of the grille.

A significant advantage of the present invention is that the detrimental effect that the decorative metallic layer has on the flexural modulus of the grille is significantly minimized. Specifically, decorative materials such as chromium are hard and relatively brittle. Accordingly, such materials are not relatively flexible, and will significantly increase the flexural modulus of the grille. Because the grille of this invention is characterized by having the decorative metallic layer limited to only the decorative surfaces of the grille, the grille exhibits significantly better flexural properties as compared to a grille which is entirely covered with a decorative metallic coating. In addition, because the decorative metallic coating is absent from the interior surface of the grille, the decorative metallic coating will be less likely to crack when the grille is impacted in a manner that places the interior surface of the grille in tension.

As a result of the above capabilities, the midsection of the grille is freely able to flex even though the grille is firmly attached to the automobile body or hood at points along the upper edge and the lower edge of the grille. As a result, the grille is sufficiently secured so as to be resistant to aerodynamic and road-induced vibrations, yet will freely flex when impacted directly or forced to stroke with the bumper during an impact. Enhanced flexibility also improves the ability of the grille to withstand an impact without suffering permanent damage.

In addition, a significant advantage of this invention is that the prior teachings of Chase are compatible with the present teachings of this invention. Specifically, the section modulus of predetermined regions of the grille can be modified to further enhance the flexural properties of the grille without affecting the selective plating technique of this invention. As a result, optimum flexural properties can be achieved for a given grille design and application without adversely affecting the exterior appearance of the grille.

Accordingly, it is an object of the present invention to provide an automobile grille having a decorative metallic coating thereon, wherein the grille is able to withstand a predetermined impact without permanently damaging the grille or its decorative metallic coating.

It is a further object of this invention that such an automobile grille be suitable for use on an automobile having an impact-absorbing bumper, such that the grille is capable of resiliently deflecting with the maximum stroke of the bumper.

It is still a further object of this invention that the decorative metallic coating of such an automobile grille be selectively deposited on the surface of the grille so as to enhance the flexural properties of the grille.

It is another object of this invention that, by concentrating the flexure of the grille in predetermined areas, the grille can be rigidly attached to the automobile body without the need for additional pivoting hardware or resilient brackets to support the grille.

It is still another object of this invention that such a grille be securable to the automobile body so as to provide structural resistance to environmental effects such as wind and vibration.

Other objects and advantages of this invention will be more apparent after a reading of the following detailed description taken in conjunction with the drawings provided.

BRIEF DESCRIPTION OF THE DRAWINGS

FIG. 1 is a frontal view of an automobile front end having an impact-absorbing bumper and a grille in accordance with a preferred embodiment of this invention;

FIG. 2 is a cross-sectional view of the automobile front end taken along line 2—2 of FIG. 1; and FIG. 3 is a cross-sectional view of the automobile front end of FIG. 1 illustrating the reaction of the grille during impact with an obstacle in accordance with the preferred embodiment of this invention.

DETAILED DESCRIPTION OF THE PREFERRED EMBODIMENT

With reference to FIG. 1, there is shown an automobile front end portion 18 having a decorative grille 10 secured to its front end sheet metal panels. As illustrated, the grille 10 is mounted to the forward edge of an engine hood 14 between a pair of forward hood structures 20. The downward extending hood structures 20 separate the grille 10 from a pair of headlamps 12. In this position, the grille is suspended above a front bumper 16 of the automobile front end portion 18. According to the preferred embodiment, the grille 10 can be mounted so as to be substantially flush with its surrounding automobile body panel structure, such as the bumper 16, hood 14 and downward extending hood structures 20, as shown in FIG. 1.

In current automobiles, the bumper 16 is an impact-absorbing bumper which is designed to withstand and absorb a predetermined impact without permanent deformation. At this time, such bumpers 16 are required to absorb a 5 mile per hour impact, after which the bumper 16 must return to its pre-impact position. During the course of an impact, the bumper 16 may travel rearward of the automobile front end portion 18 three inches or more. After impact, during which the energy of the impact is dissipated through the resilient structure of the bumper 16, the bumper 16 will return to its original position.

Because the grille 10 is mounted substantially flush with the bumper 16, the grille 10 is required to resiliently respond to an impact to the bumper 16, necessitating that the grille 10 also be able to resiliently flex three inches or more. The grille 10 is generally formed to have a patterned central portion which includes a cross hatch or vertical arrangement of slats 42. As best seen in FIGS. 2 and 3, the grille 10 has an upper support member 22 which generally extends horizontally adjacent the engine hood 14 of the automobile, a lower support member 24 which generally extends horizontally adjacent the bumper 16, and an intermediate member 28 which extends horizontally approximately midway between the upper and lower support members 22 and 24 and a pair of vertical support members 26 interconnecting the adjacent lateral ends of the upper and lower support members 22 and 24 and the intermediate member 28. As shown, the upper support member 22 is configured to be attached to the automobile with an upper support fastener 36, and the vertical support members 26 are each configured to be attached with a lower support anchor 34 and fastener 38 to one of the forward hood structures 20. Any suitable fastener may be used, though consideration must be given for the requirement that the grille 10 be structurally resistant to wind and vibrational forces generated when the automobile is in motion. Secured in the above manner, the midsection of the grille 10 is readily able to flex when impacted from the front of the automobile.

The grille 10 defines an exterior or front surface which is visible from the front of the automobile, as suggested by FIG. 1. Accordingly, the front surface constitutes the decorative surface of the grille 10. The grille 10 also has an oppositely disposed interior or rear surface which faces the engine compartment of the automobile, as seen in FIGS. 2 and 3. The slats 42 which compose the central pattern of the grille 10, as well as the upper and lower support members 22 and 24, the vertical support members 26 and the intermediate member 28, define numerous side surfaces which are intermediate and, as illustrated, approximately perpendicular to the front and rear surfaces. Due to the manner in which the grille 10 is secured to the automobile front end portion 18, the front surface of the grille 10 will be primarily in compression as the grille 10 flexes rearwardly during a direct frontal impact of the grille 10, while the rear surface will be primarily in tension. As illustrated in FIG. 3, the front surface may also be locally in tension at the point of impact, while the opposing rear surface may locally be in compression.

Because the grille 10 described above is required to resiliently flex with the bumper 16 during a collision, the material and structure of the grille 10 must be such that the flexure of the grille 10 acts to absorb the impact without the grille 10 fracturing. Accordingly, the material of the grille 10 must be resilient and have sufficient impact resistance to withstand the hostile environment of the bumper 16. A particularly suitable material for the grille 10 is a high impact plastic, such as polycarbonate (PC), acrylonitrile-butadiene-styrene (ABS), or a modified PC/ABS material. Because flexing primarily occurs in the central and lower portions of the grille 10, it is preferable that at least the lower support member 24 and the vertical grille slats 42 be formed from the preferred high impact polymeric material, though manufacturing practices will typically favor forming the entire grille 10 from such a material.

In addition, for purposes of the present invention, any decorative metallic coating adhered to the grille 10 must also be compatible with the required flexibility of the grille 10. Conventionally, all surfaces of an automobile grille are plated with a decorative metallic coating for purposes of enhancing the aesthetic appearance of the grille 10. The metallic coating most often used for automotive applications is electroplated chromium, which is capable of producing a highly reflective surface on the grille 10. However, chromium plating is hard and relatively brittle. Accordingly, the presence of chromium plating on the grille 10 significantly reduces the grille's flexural properties, as quantified by its flexural modulus. For example, a ⅛ inch thick bar formed from a modified PC/ABS material can exhibit a flexural modulus of about 350,000 psi, while the same bar plated on all surfaces with a thin layer of electroplated chromium may exhibit a flexural modulus of about 2,000,000 psi. While such a flexural modulus will allow for substantial flexing without permanent damage to the grille 10 or chromium plating, a lower flexural modulus would significantly enhance the degree of flexibility of the grille 10. More particularly, a lower flexural modulus would promote the ability of the grille 10 to survive the maximum design stroke of the bumper 16, i.e., about three inches or more.

In addition, a metallic coating such as electroplated chromium is not highly resistant to tensile loads because it is hard and brittle. Accordingly, chromium plating on the grille 10 will tend to crack when placed in tension. As an example, when the grille 10 is impacted by an object external to the automobile such that the rear surface is placed in tension, chromium plating on the rear surface will also be placed in tension. If the tensile load is sufficiently high, the chromium plating will crack, with cracking and peeling ultimately propagating to all of the chromium plating on the grille 10. If the section modulus of the grille 10 is modified to promote bending at predetermined locations, tensile loading on the electroplated chromium will also be localized, so as to further encourage cracking of the chromium plating.

In accordance with the present invention, the above problems are solved by selectively electroplating the grille 10 of the invention, so as to optimize the flexural modulus of the grille 10. With reference to FIGS. 2 and 3, the grille 10 of the invention is provided with an electroplated chromium plating 32 on only the front surface of the grille 10, i.e., the surface of the grille 10 which is visible to an observer from the front of the automobile. In addition, the side surfaces of the grille 10, i.e., those intermediate the front surface and the rear surface of the grille 10, may also be plated. However, plating of the side surfaces is preferably limited to those portions which are contiguous with the front surface and to the forward side of the grille's neutral bending axis, which approximately bisects the grille 10 into a front and rear half. Theoretically, stresses within the grille 10 during flexing will net to zero at the neutral bending axis, with material on the forward side of the neutral bending axis being in compression and material on the rearward side of the neutral bending axis being in tension.

The influence of the selective plating method of this invention on the impact-resilience of the grille 10 can be seen by comparing FIGS. 2 and 3. FIG. 2 shows a cross-sectional side view of the grille 10 prior to impact with an object, while FIG. 3 shows the same cross-sectional side view in which the grille 10 has been impacted by an obstacle 40. As shown, the deflection of the grille 10 is localized in the lower support member 24 with minimal effect on the intermediate and upper support members 28 and 22. As illustrated, the front surface of the grille 10 is locally in tension, while the rear surface of the grille 10 is locally in compression. However, as a result of the preferred manner in which the grille 10 is attached to the automobile front end portion 18, the chromium plated front surface of the grille 10 will be predominantly in compression while the unplated rear surface is predominantly in tension. Accordingly, with the teachings of the present invention in which the rear surface of the grille 10 is not chromium plated, the detrimental effect which chromium plating has on the flexural modulus of the grille 10 is minimized. Furthermore, the chromium plating 32 on the front surface of the grille 10 will predominantly be subjected to a localized compressive load, and therefore less likely to crack. With the enhanced degree of flexibility provided by the above concept, the grille 10 is more readily able to resiliently flex throughout the entire stroke of the bumper 16, as shown in FIG. 3, such that the grille 10 can remain substantially flush with the bumper 16 during impact without being plastically deformed.

To achieve the above advantages, the present invention utilizes a resist painting technique which serves to prevent chromium metal from being deposited on surfaces of the grille 10 which have been coated with a resist paint. Resist paints are well known in the art, and are conventionally used to provide a paintable surface on a chrome plated article. Because paint will not adhere well to a chrome plated surface, the surface of the article intended to be painted will be coated with a resist paint, which prevents the deposition of chromium on that particular surface.

In accordance with this invention, a resist painting technique is used to selectively electroplate the grille 10. A preferred resist paint composition for purposes of this invention is a modified solution vinyl lacquer, though it is foreseeable that other resist paints could also be used. Suitable vinyl lacquers which are commercially available include XL2223 from Siebert Oxidermo, and RB60AA-65 from Quality Coating. Such vinyl lacquers can be selectively applied to the grille 10 prior to plating using a dip or spray paint technique. Generally, dipping methods are used to prevent the plating of specific structure, such as tabs and attachments which protrude from the grille 10, areas for heat stacking, self-tapping screws, or for receiving barbed fasteners. Spray methods are typically used in conjunction with a hard mask to aesthetically place chromium on a part. As is well known to those skilled in the art, a hard mask is a metal cover which prevents the deposition of the resist paint during the resist painting process.

The preferred method of this invention involves depositing the modified solution vinyl lacquer on the rear surface of the grille 10, and preferably on the side surfaces of the grille 10 contiguous with the rear surface and rearward of the neutral bending axis of the grille 10. The vinyl lacquer is then dried, either by air drying at room temperature for at least about an hour, or in an oven at a temperature of about 140° F. to about 165° F. for a duration of about five to about fifteen minutes.

As is conventional when plating plastics, the grille 10 is then subjected to an acid etch. The acid used in this process may be any one of a number of conventional acids used in the pretreatment of plastics prior to plating. A chromic-sulfuric acid has been found especially suitable for the method according to this invention. As is conventional, the acid is preferably present within a bath in which the grille 10 is dipped. The time of the acid treatment and the temperature of the bath may vary over a wide range depending on the concentration of the acid in the bath, the nature of the acid, and the particular composition of the plastic material. The acid concentration, time and temperature are selected to effectively etch and roughen the surface of the grille 10 to make it suitable for plating. Importantly, however, the acid does not attack the rear and side surfaces of the grille 10 covered with the resist paint, but is absorbed by the resist paint.

Following the acid etch, a conventional neutralizing technique is used to eliminate the acid from the surfaces of the grille 10. However, the neutralizer will not affect the acid absorbed by the resist paint. Deposition of the chromium plating 32 is then accomplished by first electrolessly depositing a layer of an appropriate metal strike onto the substrate, and then electrochemically depositing the chromium onto the metal strike layer. A conventional catalyst, such as palladium, is used to catalyze the electroplating of the chromium onto the surfaces of the grille 10. The catalyst is absorbed by the roughened surfaces of the grille 10. However, the acid absorbed by the resist paint "poisons" the catalyst in those surfaces coated by the resist paint, such that during the electroplating process, the chromium metal will only be deposited on those surfaces of the grille 10 which are not coated with the resist paint. Suitable electroplating processes, which generally involve depositing a thin layer of chromium metal on the grille 10 by passing an electric current through an aqueous solution of a salt containing chromium ions, are well known to those skilled in the art, and will not be described in further detail.

From the above, it can be appreciated that a resist painting technique can be utilized to selectively plate the grille 10, so as to optimize the flexural properties of the grille 10. The preferred resist painting technique can be readily used to limit the deposition of chromium to roughly half or less of the total surface area of the grille 10, such that the grille 10 will exhibit a flexural modulus closer to that of the plastic material from which the grille 10 is formed. Consequently, the flexibility of the grille 10 is significantly improved, particularly when compared to an identical grille which is chromium plated on all of its surfaces, such that the tendency for the grille 10 to be permanently damaged when required to stroke with the impact-absorbing bumper 16 is significantly reduced.

Accordingly, a significant advantage of the present invention is that the detrimental effect that the chromium plating 32 has on the flexural modulus of the grille 10 is significantly minimized. In addition, because the chromium plating 32 is more tolerant of compression loads than tensile loads, the flexural properties of the grille 10 can be suitably maintained by eliminating the chromium plating 32 from the surfaces of the grille 10 which are predominantly subjected to a tensile load during a direct frontal impact of the grille 10. In particular, because the chromium plating 32 is absent from the rear surface of the grille 10, the tendency for the chromium plating 32 to crack is significantly reduced.

To evaluate the degree of improvement in flexural properties which can be obtained in accordance with the teachings of the present invention, four flexural specimens were formed from a modified PC/ABS material for comparative testing. Each specimen was approximately 6 inches long, with approximately a 0.5 by 0.5 inch square cross section. The neutral bending axis of each specimen, designated Specimens A, B, C and D, was designated to be parallel to the longitudinal length of each specimen. A first surface of each specimen was designated to be the specimen's top surface, against which a flexural load would be applied in a direction normal to this surface. The two surfaces contiguous with the top surface, and generally parallel to the direction in which the flexural load would be applied, were designated as side surfaces. The last surface, opposite the top surface, was designated the bottom surface.

Due to the geometry of the specimens described above, the neutral bending axis of each specimen defined a bending plane which was parallel to the top and bottom surfaces and which approximately bisected the side surfaces (i.e., the specimens were essentially divided in half, with the bending plane being approximately ¼ inch from the top and bottom surfaces). As such, the upper half of each specimen, encompassing the top surface and the upper half of each side surface, would be in compression, and the lower half of each specimen, encompassing the bottom surface and the lower half of each side surface, would be in tension when subjected to the flexural load.

The specimens were then electroplated with a chromium plating of comparable thickness, but with the following exceptions: Specimen A was completely chromium plated; Specimen B was completely chromium plated except for the bottom surface and a contiguous ⅛ inch strip (approximately the lower ¼) of each side surface; Specimen C was plated such that all surfaces which were to be in tension, i.e., the bottom surface and the lower half of each side surface, were free of chromium plating; and Specimen D was plated such that only the top surface and a contiguous ⅛ inch strip (approximately the upper ¼) of each side surface were chromium plated. The unplated surfaces of Specimens B, C and D were each achieved in accordance with the resist painting method taught by this invention.

Each specimen was then successively placed, top surface facing upward, on a pair of stationary mandrels spaced approximately three inches apart. The flexural load was then gradually imposed on the top surface of the specimen between the mandrels to determine how much deflection could be achieved before fracture of the specimen's chromium plating occurred. Results of the flexural test are summarized below.

| Specimen | Surfaces Plated | Deflection at Fracture |
| --- | --- | --- |
| A | Top, Sides & Bottom | 0.48 millimeters |
| B | Top & ¾ of Sides | 0.70 millimeters |
| C | Top & ½ of Sides | 0.80 millimeters |
| D | Top & ¼ of Sides | 0.92 millimeters |

From the above, it can be seen that the degree to which a specimen was able to be deflected prior to fracture of the chromium plating was significantly dependent on the degree to which the specimen was covered by the chromium plating. The more surface area there was free of chromium plating, the greater was the flexibility of the specimen. In addition, the results indicated that if the chromium plating 32 could be eliminated from surface areas subjected to tensile loading when the grille 10 is flexed, the grille 10 would be capable of significantly greater bending before the chromium plating 32 cracked. Accordingly, the grille 10 selectively plated in accordance with the above can be firmly attached to the automobile front end portion 18 as shown in FIGS. 2 and 3, yet will be more readily able to flex with the maximum design stroke of the impact-absorbing bumper 16, without incurring permanent damage to the grille 10 or the chromium plating 32.

In addition, a significant advantage is that the selective plating technique utilized in the present invention is compatible with the teachings of U.S. Pat. No. 5,205,597 to Chase, wherein the section modulus of predetermined regions of the grille 10 are modified to further enhance the flexural properties of the grille 10 without affecting the exterior appearance of the grille 10. As a result, flexibility of the grille 10 can be significantly modified and optimized for a variety of different applications.

Accordingly, the present invention provides an automobile grille 10 which is more readily capable of withstanding a frontal impact without permanent damage to the grille 10 or its decorative chromium plating 32. By optimizing the flexural properties of the grille 10 in accordance with this invention, the resulting enhanced flexibility renders the grille 10 particularly suitable for mounting flush with an impact-absorbing bumper 16, in that the grille 10 is more readily capable of resiliently deflecting throughout the entire stroke of the bumper 16. In addition, selectively depositing the chromium plating 32 on surfaces of the grille 10 which predominantly see compressive loading significantly reduces the likelihood that the chromium plating 32 will crack in tension.

While the present invention has been discussed primarily with reference to a front grille of an automobile, these teachings are also applicable to other automotive-related components which require a degree of resilience in order to withstand impacts from objects. Examples include critical areas of bumper trim, truck bumper covers and air dams, as well as other decorative components which are likely to experience high levels of deformation.

Accordingly, while the invention has been described in terms of a preferred embodiment, it is apparent that other forms could be adopted by one skilled in the art. For example, different processing steps and parameters could be adopted by one skilled in the art to achieve the selective chromium plating achieved by this invention. Additionally, the geometry of the grille 10 could be significantly altered, while still being able to take advantage of the enhanced flexibility achievable by the teachings of this invention. Accordingly, the scope of the invention is to be limited only by the following claims.

What is claimed is:

1. A method for forming an automobile grille having a decorative coating so as to promote the flexural properties of said automobile grille, said method comprising the steps of:

forming said automobile grille to have a first segment, a second segment, and a plurality of support members interconnected with said first and second segments, said plurality of support members being formed from a polymeric material having a predetermined flexural modulus, said automobile grille having a first surface, an oppositely disposed second surface, and a side surface intermediate said first surface and said second surface, said first surface defining an outer decorative surface of said automobile grille; and selectively depositing a metal on said first surface so as to form a decorative metallic layer on said first surface of said automobile grille without substantially forming said decorative metallic layer on said second surface;

whereby said automobile grille is characterized by enhanced flexural properties in the absence of said decorative metallic layer on said second surface, so as to enable said automobile grille to more readily flex when impacted by an object without plastically deforming said automobile grille and without cracking said decorative metallic layer.

2. The method of claim 1 wherein said selectively depositing step is a chromium electroplating process.

3. The method of claim 1 wherein said forming step includes forming said automobile grille from an impact-resistant thermoplastic selected from the group consisting of polycarbonate and acrylonitrile-butadiene-styrene.

4. The method of claim 1 wherein said selectively depositing step includes preventing the deposition of said metal on said second surface and at least a portion of said side surface of said automobile grille.

5. The method of claim 1 wherein said selectively depositing step comprises:

applying a resist solution to at least said second surface of said automobile grille;

drying said resist solution so as to form a resist layer on at least said second surface of said automobile grille;

exposing said automobile grille to an acid such that said acid is absorbed by said resist layer on said second surface and said acid etches said first surface so as to enhance electroplating of said first surface;

exposing said automobile grille to a neutralizer so as to substantially eliminate said acid from said first surface without substantially eliminating said acid from said second surface;

exposing said automobile grille to a catalyst such that said catalyst is absorbed in said first surface but is substantially prevented from being absorbed in said second surface by said acid absorbed by said resist layer; and depositing said metal on said first surface so as to form said decorative metallic layer on said first surface of said automobile grille without forming said decorative metallic layer on said second surface.

6. The method of claim 5 wherein said resist solution is a modified solution vinyl lacquer.

7. The method of claim 5 wherein said step of applying includes applying said resist solution to said second surface and at least a portion of said side surface of said automobile grille.

* * * * *